Nov. 1, 1927. 1,647,287

C. L. FLOYD

TENSION MEASURING DEVICE

Filed Sept. 30, 1924

Inventor
Charles L. Floyd
by

Patented Nov. 1, 1927.

1,647,287

UNITED STATES PATENT OFFICE.

CHARLES LEWIS FLOYD, OF RIVERSIDE, ILLINOIS, ASSIGNOR TO WESTERN ELECTRIC COMPANY, INCORPORATED, OF NEW YORK, N. Y., A CORPORATION OF NEW YORK.

TENSION-MEASURING DEVICE.

Application filed September 30, 1924. Serial No. 740,725.

This invention relates to tension measuring devices, and more particularly to a device for measuring the tension in strand material.

The object of the invention is to provide an improved tension measuring device which may be easily and quickly applied to strand material and readily adapted for measuring widely differing ranges of tension.

In order to attain the above mentioned object, in accordance with the features of the invention there are provided in one embodiment thereof three spaced rollers adapted to engage a strand, the tension of which is to be measured, the intermediate roller carrying an index pointer and being resiliently attached by a coiled spring to a handle which also carries an index pointer. The outer rollers are mounted on a handle pivoted at a common point with the first mentioned roller and handle and which carries a calibrated scale. When the rollers engage the strand the handles are moved toward each other until the first index pointer is at a predetermined point of the scale corresponding with the size of the strand, whereupon the position of the other index pointer relative to the calibrated scale indicates the tension in the strand. Other scales and coiled springs may be readily substituted when different ranges of tension values are to be measured.

Figure 1:
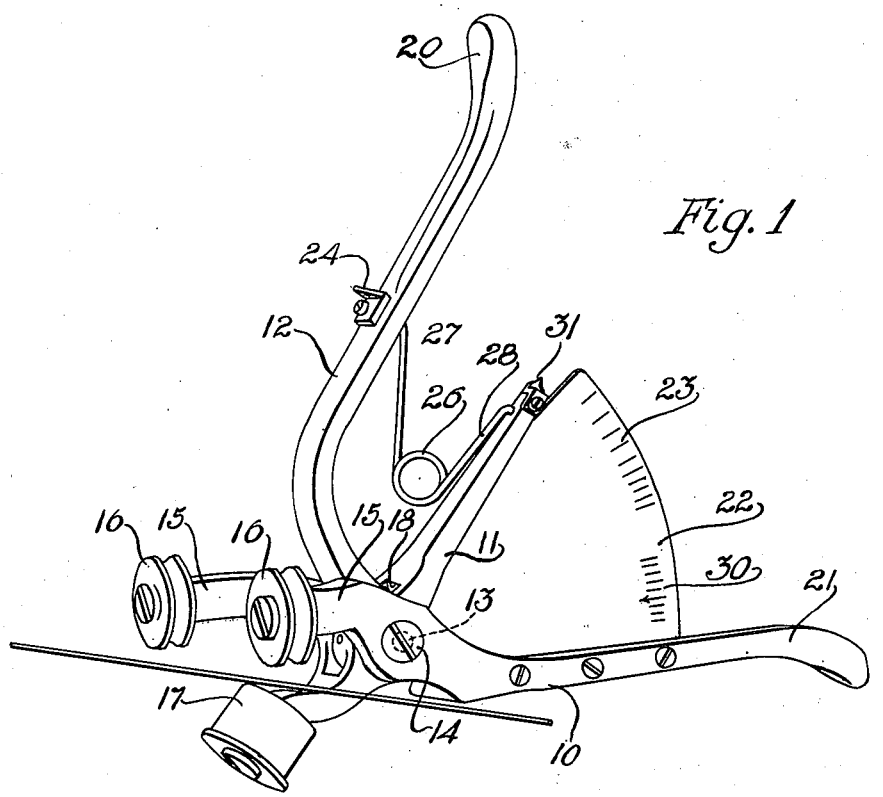
Figure 2:
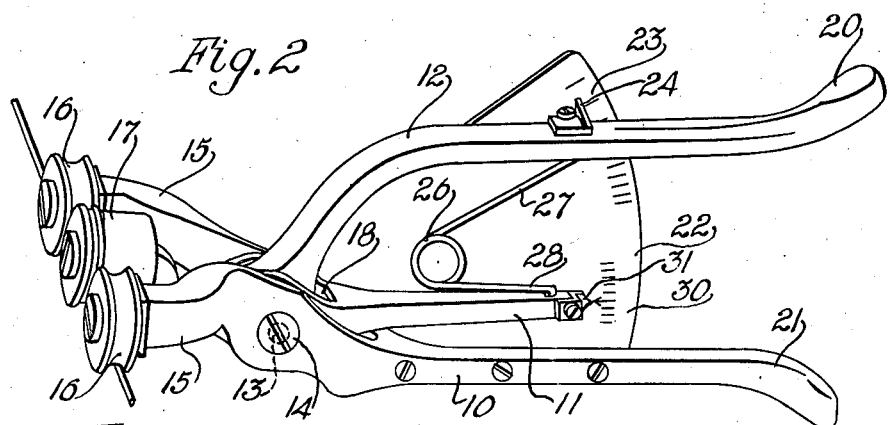
Figure 3:
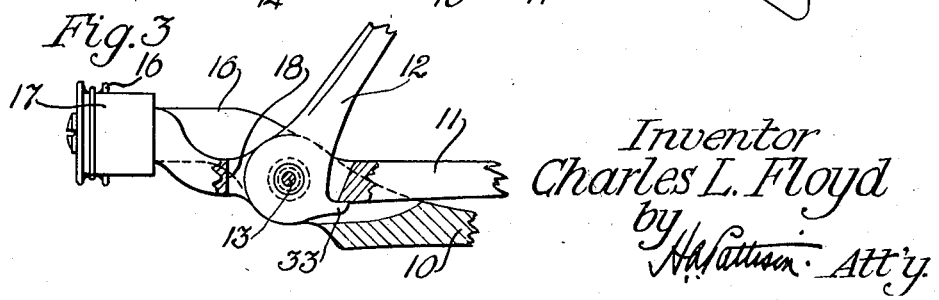

It is believed that the invention will be clearly understood from the following description and the accompanying drawings illustrating one embodiment of the invention, in which Fig. 1 is a perspective view of the device showing the manner in which it is applied to a strand under tension;

Fig. 2 is a perspective view of the device showing it as applied to a strand under tension and during the reading of the indicated tension in the wire, and Fig. 3 is a fragmentary view partly in section of the device.

The device as illustrated in the drawings comprises a plurality of levers 10, 11, and 12, all pivotally carried upon a bearing pin 13 and locked thereon by a screw 14. The lever 10 at one end terminates in a pair of forwardly extending relatively diverging arms 15 which are disposed in a common plane. Each of the arms 15 carries a grooved roller 16 upon its extreme forward end and upon the extreme forward end of the lever 11 which is mounted upon the pin 13 intermediate the arms 15 is a roller 17. The roller 17 is provided with a comparatively wide peripheral surface and a single flange at its forward end so that in applying the device to a wire or other strand to be tested as illustrated in Fig. 1, the wire will engage the wide surface of the roller 17 and ride forward thereon as it is operated to assume the position indicated in Figs. 2 and 3. The lever 12 is mounted upon the bearing pin 13 within an elongated opening 18, in alignment with the roller 17 and extends upward and rearward with its extreme rear end constituting a handle 20. A second handle 21 is formed upon the extreme rear end of the lever 10 and in the same plane with the handle 20. Secured by screws or other suitable fastening means to the outside face of the handle 21, is a segmental shaped plate 22 provided at one portion with a scale 23 which is calibrated for a particular range of tension values, preferably representing pounds. Cooperating with the scale 23, and carried upon the handle 20 is an index pointer 24. The levers 11 and 12 are normally urged apart by a coiled spring 26 having its longer arm 27 engaging in a suitable depression formed in the lever 12 and its shorter arm 28 in a suitable depression formed in the lever 11.

Below the scale indications 23 upon the dial plate 22 is another calibrated scale 30, each indication thereof representing a different size of wire to be tested. Secured to the extreme rear end of the lever 11 is an index pointer 31 which cooperates with one of the particular indications of the scale 30 in the operation of the device, which will be explained hereafter. The spring 26 may be easily removed and replaced by another, the tension of which is such as to meet the particular range of tension to which the wire to be tested is subjected by simply drawing the two arms 27 and 28 thereof together, which movement draws the ends of the arms from the depressions in the levers 11 and 12. To prevent the levers 11 and 12 from moving apart to such a distance that a spring 26 of any tension mounted therebetween upon reaching its limit of expansion might drop from between the levers 11 and 12, a lip 33 is formed upon the lever 12 close to its pivot point, which is adapted to engage the underside of the lever 11 as clearly indicated in Fig. 3 when the device is suspended by the handle 20 in applying the device to a wire to be tested.

The principle on which the design of the device is based is that in any balanced system of forces acting on a point the resultant is zero. If a wire is engaged by the rollers 16 and deflected by the roller 17 intermediate the rollers 16, there exists a system of forces in equilibrium, and if the amount of deflection of the wire and the force required to produce this deflection be known, it is possible to calculate the tension in the wire. The device heretofore described when properly calibrated provides a convenient method of obtaining this information, as will be evident from the following description of the mode of operation.

In using the device a spring 26 having characteristics which have been found by practice to be most suitable for the particular range of tensions to which the wire to be tested may be subjected, is first mounted between the levers 11 and 12 and thereafter the device is applied to the wire to be tested by entering the wire between the roller 17 and the rollers 16 as illustrated in Fig. 1. The handles 20 and 21 are then moved toward each other, which movement through the resilient connection between the levers 11 and 12 formed by the spring 26, turns the lever 11 in a clockwise direction, thereby moving the roller 17 into position between the rollers 16 and deflecting the wire being tested as clearly illustrated in Fig. 2. During this movement, the operator watches the index pointer 31 and when it is in line with the particular indication upon the scale 30, corresponding to the size of the wire, thus insuring that the wire has been deflected to the predetermined amount for which the device is designed, the position of the index pointer 24 upon the scale 23 is noted, which position indicates in pounds the tension on the wire being tested.

From the foregoing description it will be seen that the device described is of comparatively simple formation in its construction and the arrangement of its parts and that it can be operated with but very little skill on the part of an operator. It will be clearly understood that the device can be applied to various kinds of material, either in strand or other forms positioned either horizontally, vertically or otherwise, and may also be readily adapted to stationary strands, although particularly devised and illustrated in the drawings for measuring the tension in running strands.

What is claimed is:

1. A device for measuring the tension in material, comprising a lever bifurcated at one end, each furcation having a member for engaging the material, a plurality of resiliently interconnected elements pivoted between the furcations on a common pivot, one of said elements adapted to cause a deflection in the material upon an actuation of another of said elements, and means secured to said elements for indicating the amount of tension in the material.

2. A device for measuring the tension in material, comprising a lever bifurcated at one end, each furcation having a member designed for engaging the material, a pair of resiliently interconnected elements pivoted between the furcations on a common pivot, one of said elements adapted to cause a deflection in the material intermediate said members upon an actuation of the other of said elements, an index member secured to each of said elements, and calibrated means carried by said lever cooperating with said index members for indicating the amount of tension in the material.

3. A device for measuring the tension in material, comprising a lever bifurcated at one end, each furcation having a member for engaging the material, a plurality of resiliently interconnected elements pivoted between the furcations on a common pivot, one of said elements adapted to cause a deflection in the material upon an actuation of another of said elements, means secured to said last mentioned element for indicating when the material has been deflected a predetermined amount thereby, and other means secured to another of said elements for indicating the amount of tension in the material simultaneously with the before mentioned indication of said other element.

4. A device for measuring the tension in material, comprising a lever bifurcated at one end, each furcation having a member for engaging the material, a plurality of resiliently interconnected elements pivoted between the furcations on a common pivot, one of said elements adapted to cause a deflection in the material intermediate said members upon an actuation of another of said elements, a scale plate carried by said lever having different calibrated portions, one of said portions adapted to indicate when the material has been deflected a predetermined amount and another of said portions the tension values, and indexing means carried by each of said elements cooperating with the calibrated portions of said scale upon actuation of said material deflecting element to move the associated indicating means to a predetermined position upon the first mentioned portion of said scale, thereby positioning the indexing means carried by another of said elements upon the second mentioned portion of the scale to indicate the tension in the material.

5. A device for measuring the tension in a strand, comprising a lever bifurcated at one end, each furcation having a member for engaging the strand, a pair of levers pivoted between the furcations on a common pivot, a resilient connection between said levers of the pair, one of said levers of the pair adapted to cause a deflection in the strand intermediate said members upon an actuation of said other lever of the pair, and means carried by the bifurcated lever and pair of levers for indicating the amount of tension in the strand.

6. A device for measuring the tension in a strand, comprising a lever bifurcated at one end and having two arms in a common plane and adapted to engage the strand, a pair of levers in a common plane pivoted upon a common pivot intermediate said two arms, one of said pair of levers adapted to cause a deflection in the strand intermediate said two arms upon an actuation of said other lever of the pair, a resilient connection between said levers, and means secured to said levers for indicating the amount of tension in the strand.

7. A device for measuring the tension in a strand, comprising a lever provided with a handle portion and having a plurality of members for engaging the strand, a pair of resiliently interconnected levers pivoted on a common pivot with said first mentioned lever, one of said pair of levers adapted to cause a deflection in the strand intermediate said members upon an actuation of said other lever of the pair, said other lever of the pair having a handle portion in a common plane with the first mentioned handle, and means secured to said levers for indicating the amount of tension in the strand.

8. A device for measuring the tension in a strand, comprising a lever provided with a handle portion and having a pair of members in a common plane for engaging the strand, a pair of levers pivoted upon a common pivot with the first mentioned lever, one of said levers of the pair adapted to cause a deflection in the strand intermediate said pair of members upon an actuation of said other lever of the pair, a spring adapted to form a resilient connection therebetween, said other lever of the pair having a handle portion disposed opposite the first mentioned handle, and means secured to the levers for indicating the amount of tension in the strand.

In witness whereof, I hereunto subscribe my name this 19 day of September, A. D., 1924.

CHARLES LEWIS FLOYD.